United States Patent [19]

Smith et al.

[11] Patent Number: 5,599,886
[45] Date of Patent: Feb. 4, 1997

[54] LIQUID TONERS WITH HYDROCARBON SOLVENTS

[75] Inventors: Terrance P. Smith, Woodbury; S. Prabhakara Rao, Maplewood; David W. Macomber, St. Paul, all of Minn.

[73] Assignee: Minnesota Mining and Manufacturing Company, St. Paul, Minn.

[21] Appl. No.: 605,575

[22] Filed: Feb. 22, 1996

Related U.S. Application Data

[62] Division of Ser. No. 314,952, Sep. 29, 1994, Pat. No. 5,521,271.

[51] Int. Cl.$^6$ .......................... C08F 4/16; C08F 214/18; C08F 226/02; C08F 230/08; C08F 226/06; C08F 220/10

[52] U.S. Cl. .......................... 526/90; 526/242; 526/258; 526/265; 526/279; 526/310; 526/328.5

[58] Field of Search .......................... 526/90, 242, 258, 526/265, 279, 310, 328.5

[56] References Cited

U.S. PATENT DOCUMENTS

| | | |
|---|---|---|
| 2,297,691 | 10/1942 | Carlson . |
| 2,752,833 | 7/1956 | Jacob . |
| 2,986,466 | 5/1961 | Kaprelian . |
| 3,344,098 | 9/1967 | Horiguchi et al. . |
| 3,553,133 | 1/1971 | Olson . |
| 3,690,756 | 9/1972 | Smith . |
| 3,743,503 | 7/1973 | Goldman et al. . |
| 3,753,760 | 8/1973 | Kosel . |
| 3,900,412 | 8/1975 | Kosel . |
| 3,991,226 | 11/1976 | Kosel . |
| 4,268,598 | 5/1981 | Leseman et al. . |
| 4,321,404 | 3/1982 | Williams et al. . |
| 4,370,047 | 1/1983 | Damouth et al. . |
| 4,403,848 | 9/1983 | Snelling . |
| 4,467,334 | 8/1984 | Anzai . |
| 4,564,574 | 1/1986 | Uytterhoeven et al. . |
| 4,614,521 | 9/1986 | Niwa et al. . |
| 4,619,990 | 10/1986 | Elmasry . |
| 4,728,983 | 3/1988 | Zwadlo et al. . |
| 4,774,035 | 9/1988 | Carmelite et al. . |
| 4,778,742 | 10/1988 | Ong et al. . |
| 4,795,794 | 1/1989 | Winnik et al. . |
| 4,909,806 | 3/1990 | Garbe . |
| 4,925,766 | 5/1990 | Elmasry et al. . |
| 5,030,701 | 7/1991 | Garbe . |
| 5,063,132 | 11/1991 | Pierce . |
| 5,066,559 | 11/1991 | Elmasry et al. . |
| 5,166,326 | 11/1992 | Smith et al. . |
| 5,188,641 | 2/1993 | Parton . |
| 5,283,148 | 2/1994 | Rao . |
| 5,439,962 | 8/1995 | Yamaguchi et al. . |

FOREIGN PATENT DOCUMENTS

| | | |
|---|---|---|
| 621322 | 10/1994 | European Pat. Off. . |
| 683436 | 11/1995 | European Pat. Off. . |
| 488562 | 3/1973 | Japan . |
| 59-050449 | 3/1984 | Japan . |
| 63-314285 | 12/1988 | Japan . |
| 6902194 | 8/1969 | Netherlands . |
| 1305623 | 4/1987 | U.S.S.R. . |
| 1167161 | 10/1969 | United Kingdom . |
| 1181287 | 2/1970 | United Kingdom . |
| 1220450 | 1/1971 | United Kingdom . |
| 1314423 | 4/1973 | United Kingdom . |
| 1377067 | 12/1974 | United Kingdom . |

OTHER PUBLICATIONS

Schmidt, S. P.; Larson, J. R.; Bhattacharya, R. in *Handbook of Imaging Materials*, Diamond, A. S., Ed., Marcel Dekker, New York, 1991, pp. 227–252.

Lehmbeck, D. R. in *Neblette's Handbook of Photography and Reprography*, Sturge, J., Ed., Van Nostrand Reinhold, New York, 1977, Chapter 13, pp. 331–387.

Ito et al., *Macromolecules* 1982, 915–20.

Ito et al., *Macromolecules* 1984, 17, 2204–5.

R. S. Asquith, H. S. Blair, A. A. Crangle, E. Riordan "Self–colored Polymers Based on Anthraquinones", Journal of the Society of Dyers and Colourists; Apr., 1977; pp. 114–125.

Lord, N. W.; Peters, A. T.; *J. Chem Soc., Perkins Trans.*, 1,(20)2305–8.

Matsumoto, S.; Kubodera, K.; Kaino, T., *Appl. Phys. Lett.* 51,1 (1987).

U.S. Patent Application Ser. No. 08/243,923 filed May 17, 1994.

*Primary Examiner*—Joseph L. Schofer
*Assistant Examiner*—Wu C. Cheng
*Attorney, Agent, or Firm*—Gary L. Griswold; Walter N. Kirn; Arlene K. Musser

[57] ABSTRACT

Polymeric dyes that comprise (a) segments that render the dyes soluble or dispersible in hydrocarbon solvents and (b) segments that impart color. The polymeric dyes can be introduced into hydrocarbon solvents or formed in hydrocarbon solvents to form stable colored dispersions, which can be used as toners for electrophotography. In these toners, the polymeric dye contains macromeric moieties that render the polymeric dye dispersible in hydrocarbon solvents. The polymeric dye may contain either a charge-directing chelating moiety or a surface-release promoting moiety or both of these moieties.

9 Claims, No Drawings

LIQUID TONERS WITH HYDROCARBON SOLVENTS

This is a continuation of application Ser. No. 08/314,952 filed Aug. 29, 1994 U.S. Pat. No. 5,521,271.

BACKGROUND OF THE INVENTION

1. FIELD OF THE INVENTION

This invention relates to liquid toners that are useful for electrographic and electrophotographic processes.

2. DISCUSSION OF THE ART

A general discussion of color electrophotography is presented in "Electrophotography," by R. M. Schaffert, Focal Press, London & New York, 1975, pp. 178–190.

Electrophotographic systems are systems in which a toner is deposited on a charged surface and subsequently transferred to a receiving sheet. Electrophotographic systems employing liquid toners are well known in the imaging art. See, for example, Schmidt, S. P.; Larson, J. R.; Bhattacharya, R. in *Handbook of Imaging Materials*, Diamond, A. S., Ed.: Marcel Dekker, New York, 1991, pp. 227–252 or Lehmbeck, D. R. in *Neblette's Handbook of Photography and Reprography*, Sturge, J., Ed.: Van Nostrand Reinhold, New York, 1977, Chapter 13, pp. 331–387. A liquid toner is a dispersion of colloidal particles in a dispersing medium having a low dielectric constant. The particles comprise a pigment and a film-forming resin and carry an electrostatic charge. The particles in the dispersion are capable of migrating under the influence of an electric field and being deposited on a surface bearing an opposite charge, thereby forming an image.

In most instances, the preferred dispersing medium has been a high boiling hydrocarbon that has both a low dielectric constant (e.g., less than 3) and a vapor pressure sufficiently high to ensure rapid evaporation of solvent following deposition of the toner onto a photoconductor drum, transfer belt, and/or receptor sheet. An example of such a preferred solvent that is commercially available is the family of solvents having the trade designation "ISOPAR" (boiling point range: 130°–160° C). Rapid evaporation is particularly important for cases in which multiple colors are sequentially deposited and/or transferred to form a single image.

Both dyes and pigments have been used as the colorant in toners for electrophotography. One of the advantages of pigments is that migration, or "bleeding" is minimized at the fusion step The primary advantages of dyes are their bright colors and transparency. Polymeric dyes offer the advantages of being both highly transparent and non-migratory, which make them well-suited in applications requiring high quality images, such as, for example, in proofing or business graphics. Another advantage of using polymeric dyes instead of pigments is that the polymeric dyes have the potential to be more conformable to the final image receiving layer. Conformability is particularly important when the final image receiving layer is plain paper, where abrasion resistance and adhesion are considerations. A further advantage of toners containing polymeric dye over toners containing pigments is greater stability of the dispersion, because flocculation, caused by desorption of the colorant from the toner, is not possible with polymeric dyes. A process advantage of toners using polymeric dyes is that the milling operation required to incorporate a pigment in a dispersion medium is avoided.

Polymeric dyes can be classified in two classes: (1) backbone polymeric dyes and (2) pendent polymeric dyes. In backbone polymeric dyes, the chromophore is a segment in the polymeric chain. A schematic diagram of a backbone polymeric dye is shown below:

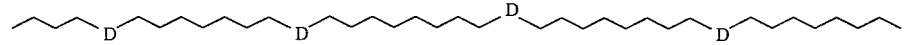

where D represents a chromophore. In pendent polymeric dyes, the chromophore is tethered to the polymeric chain either directly via the chromophore or indirectly via a connecting group, e.g., alkylene group. A schematic diagram of a pendent polymeric dye is shown below:

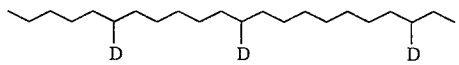

where D represents a chromophore. A typical backbone polymeric dye can be prepared by reacting a dye containing two reactive groups, such as two acid chloride groups, with a colorless organic diol or diamine. Many backbone polymeric dyes are based on polyesters or polyamides. There are two general methods for preparing pendent polymeric dyes: (1) the polymerization of a monomer containing a pendent chromophore, and (2) the reaction of a pre-formed polymer with a reactive dye or reactive dye developer. Typically, dyes produced by method (1) are made by copolymerization of a free radically polymerizable monomer having a chromophore and a colorless free radically polymerizable monomer. Co-monomers are often incorporated to modify solubility or dispersibility properties of the resultant polymer.

SUMMARY OF THE INVENTION

This invention provides novel polymeric dyes that comprise (a) segments that render the dyes soluble or dispersible in hydrocarbon solvents and (b) segments that impart color. The novel polymeric dyes can be introduced into hydrocarbon solvents or formed in hydrocarbon solvents to form stable colored dispersions, which can be used as toners for electrophotography. In these toners, the polymeric dye contains macromeric moieties that render the polymeric dye dispersible in hydrocarbon solvents. The polymeric dye may contain either a charge-directing chelating moiety or a surface-release promoting moiety or both of these moieties.

The polymeric dye preferably comprises a core comprising an acrylic copolymer and a shell comprising a hydrocarbon-swellable polymer. The polymeric dye is preferably a copolymer derived from one or more colorless monomers capable of being polymerized by free radical polymerization and one or more chromophore-containing monomers capable of being polymerized by free radical polymerization.

The charge-directing chelating moiety can be a bidentate or polydentate chelating moiety that can be incorporated into the polymeric dye for the purpose of binding a metal cation, which can function as a charge-directing agent. It is preferred that the chelating moiety be capable of forming a 5- or 6-membered ring around a coordinated metal center.

The surface release-promoting moiety can be a silicon-containing group or fluorine-containing group that can be incorporated into the polymeric dye to provide excellent transferability of the dye from the surface of a photoconductor to a substrate.

This invention further provides a process for preparing toners comprising the polymeric dyes containing macromeric moieties. The process comprises steps of:

(1) combining in a hydrocarbon solvent (a) at least one monomer capable of free radical polymerization, which at least one monomer (a) contains a chromophore that is covalently linked to the polymerizable monomer (a) and (b) at least one macromer that is dispersible in said hydrocarbon solvent to form a mixture, (2) dispersing the mixture of step (1) to form a dispersion in said hydrocarbon solvent, and (3) free radically polymerizing the polymerizable components of the emulsion formed in step (2) in the presence of a metal cation.

The macromer of the foregoing process can be derived by combining (i) monomer(s) that will render the polymeric dye soluble or dispersible in a hydrocarbon solvent, at least one of (ii) a silicone-containing or fluorine-containing monomer(s) that promote release of a polymeric film from the surface of a substrate or (iii) a charge-directing bidentate chelating monomer(s), and (iv) optional monomer(s), which preferably have pendent hydroxy (—OH) groups.

This invention also provides a method of forming an image comprising the steps of:

a) providing a dielectric medium having at least one region of electrostatic charge (e.g., an imagewise distribution of charge) on the surface thereof, b) intimately contacting the dielectric medium with a liquid toner comprising a hydrocarbon carrier liquid and charged particles of the previoulsy described polymeric dye suspended in the liquid, thereby depositing said toner in a pattern corresponding to the surface charge on the dielectric medium, and c) optionally transferring the deposited polymeric dye to a receptor.

Another aspect of the invention involves positively-charged latices that can be cathodically deposited onto a conducting material, such as aluminum, or a photoconductor that has been coated with an image release layer. Such deposited latices can be transferred to plain paper via an intermediate release surface that conforms to the roughness of the paper surface and allows for intimate contact and good. adhesion.

Another aspect of the invention involves novel polymeric dyes that comprise a polymeric moiety, a chromophore, and at least one of a charge-directing chelating moiety or a surface release-promoting moiety. In this polymeric dye, macromeric moieties are not required. However, these polymeric dyes are not as effective as toners as are the polymeric dyes containing macromeric moieties.

The present invention provides materials and processes for rapid generation of high quality electrophotographic and electrographic images. The present invention offers the following advantages:

1) a single-step preparation of a colored latex, whereby polymerization, dispersion formation, and particle stabilization are carried out simultaneously;

2) avoidance of the two-step process of polymerization of monomers to form a latex followed by the dispersion of pigments into that latex;

3) provision for bright colors of toner films and transparent non-diffusing colors, which are more transparent than pigmented toners, which may not be suitable for applications such as overhead projection.

The prior art teaches the preparation and use of pendent polymeric dye toners wherein the chromophore-containing monomer(s) and hydrocarbon-dispersing monomer(s) are co-polymerized to form a random copolymer. The prior art also teaches the use of hydrocarbon-solubilizing grafts to stabilize the resulting polymeric toner. The prior art does not teach the incorporation of bidentate or polydentate chelating groups in the polymeric dye to coordinate to the charge-directing agent, which further stabilizes the resulting toner by an electrostatic mechanism. Also, the prior art does not teach the incorporation of surface release-promoting moieties, i.e., silicone- or fluorine-containing groups, to improve the transfer of the toners from the dielectric layer to a receptor.

DETAILED DESCRIPTION OF THE INVENTION

As used herein, the expressions "hydrocarbon solvent", "hydrocarbon carrier liquid", "hydrocarbon dispersing medium", and the like, mean hydrocarbon liquid which has a resistivity of at least $10^{11}$ ohm-cm and preferably at least $10^{13}$ ohm-cm, a dielectric constant less than 3.5 and a boiling point in the range 140° C. to 220° C. The definition includes aliphatic hydrocarbons such as commercially available mixtures having the trade designations "ISOPAR G", "ISOPAR H", "ISOPAR K", and "ISOPAR L" (Exxon Chemical Company). However, aromatic hydrocarbons are also included.

The polymeric dyes of this invention that are particularly useful for preparing toners can be represented by the following formula:

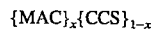

wherein MAC represents macromeric segment(s) that render the dye soluble in hydrocarbon solvents, CCS represents chromophore containing segment(s), and x represents the weight fraction of the macromeric segment(s). The value of x can range from 0.1 to 0.9, a preferred range for x being 0.15 to 0.30.

As used herein, the term "macromer" means a polymer containing free radically polymerizable terminal groups or free radically polymerizable pendent groups. In other words, a macromer is capable of further polymerization. The macromers of this invention typically have molecular weights of from about 10,000 to about 300,000, preferably greater than about 50,000, more preferably greater than about 100,000. In contrast, a polymer is generally considered to not contain free radically polymerizable groups.

Preferably, the MAC segment(s) are derived from a macromer that can be formed in a two-step process. The steps of the process include: (1) heating a mixture comprising a monomer (A) that renders the polymeric dye soluble or dispersible in a hydrocarbon solvent, at least one of a charge-directing bidendate chelating monomer (B) or a surface release-promoting silicone-containing or a fluorine-containing monomer (C), and an optional monomer (D) in the presence of a chain transfer agent and a free radical generating initiator, provided that at least one of monomer (D), the chain transfer agent, or the initiator has pendent hydroxy (—OH) groups and (2) reacting at least some of the pendent hydroxy groups with a coupling agent containing a free radically polymerizable group. However, the macromer can be made by other processes. Moreover, monomers (B), (C), and (D) are not required to be in the macromer. If neither monomer (B) or monomer (C) is used to prepare the macromeric segment(s), at least one of monomer (B) or monomer (C) must be present in the chromophore-containing segment(s).

The structure of a preferred macromer is shown below:

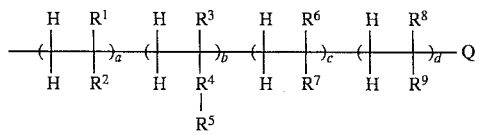

wherein $R^1$ represents hydrogen or an alkyl group having 1, 2, 3, or 4 carbon atoms;

$R^2$ represents a member selected from the group consisting of $C(O)OR^{10}$, $OR^{10}$, and $R^{10}$, wherein $R^{10}$ represents a linear, branched, or cyclic hydrocarbyl group selected from alkyl, alkaryl, and aralkyl groups having from 8 to 32 carbon atoms, inclusive;

$R^3$ represents hydrogen or an alkyl group having 1, 2, 3, or 4 carbon atoms;

$R^4$ represents a divalent linking group selected from the group consisting of oxy, thio, alkylene, arylene, aralkylene, alkarylene, and carboxy groups, and chemically stable combinations of the foregoing groups (e.g., no peroxidic linkages);

$R^5$ represents a radical moiety derived by removing a hydrogen atom from one of the following bidendate ligands: 8-hydroxyquinolinine or substituted derivative thereof, 2,2'-bipyridine or substituted derivative thereof, 1,10-phenanthroline or substituted derivative thereof, beta-diketones. Examples of betadiketone radicals are shown below.

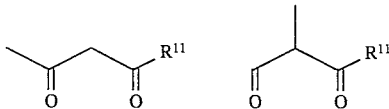

where $R^{11}$ represents a member selected from the group consisting of hydrogen, alkyl, aryl, aralkyl, and alkaryl groups;

$R^6$ represents hydrogen or an alkyl group having 1, 2, 3, or 4 carbon atoms;

$R^7$ represents a member selected from the group consisting of $C(O)OSi(R^{12})_3$, $C(O)O(CH_2)_nSi(R^{12})_3$, $(CH_2)_nSi(R^{12})_3$, $O(CH_2)_nSi(R^{12})_3$, where $R^{12}$ represents a member selected from the group consisting of alkyl, aryl, alkoxyl, trialkylsiloxy, and triarylsiloxy groups and combinations of the foregoing groups, and n represents an integer from 1 to 12, inclusive, $CH_2R_f$, $C(O)OR_f$, $OR_f$, where $R_f$ represents a fluorinated, preferably perfluorinated, group selected from the group consisting of alkyl, aryl, alkaryl, and aralkyl groups having up to 18 carbon atoms;

$R^8$ represents a member selected from the group consisting of hydrogen or alkyl group having from 1 to 4 carbon atoms, wherein Q represents a member selected from the group having the structural formula:

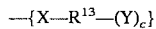

wherein $R^{13}$ represents a divalent or polyvalent linking group selected from the group consisting of alkylene, arylene, alkarylene, and aralkylene groups, X represents divalent sulfur, methylene, ethylene, or a substituted methylene group $-(CR^{14}R^{15})$, wherein $R^{14}$ and $R^{15}$ independently represent hydrogen, alkyl, aryl, cyano, or oxyalkyl group, Y represents a member selected from the group consisting of acryloxy, alkacryloxy, $-OC(O)NH(R^{14})NHC(O)C(R^{16})=CH_2$, and $-O(R^{14})C(R^{17})=CH_2$, where $R^{16}$ and $R^{17}$ independently represent hydrogen or an alkyl group having from 1 to 12 carbon atoms, inclusive, and e represents the valence of $R^{13}$ minus one; $R^9$ represents a member selected from the group consisting of hydrogen, alkyl, aryl, alkaryl, aralkyl, $C(O)OR^{18}$, and $OR^{10}$ groups, where $R^{18}$ represents a member selected from the group consisting of alkyl groups containing 1 to 7 carbon atoms, aryl groups, aralkyl groups wherein at least 50% of the carbon atoms are aromatic, alkaryl groups wherein 50% of the carbon atoms are aromatic, or alkyl derivatives where one to three of the hydrogen atoms on the alkyl group are replaced by a hydroxy, methacryloxy, acryloxy, or vinyl group.

If $R^{13}$ is divalent then the value of e is 1; if $R^{13}$ is trivalent, then the value of e is 2, and so forth. Preferably, the value of e ranges from 1 to 10, more preferably the value of e is 1 or 2. Most preferably, the value of e is 1.

The values for a, b, c, and d represent the weight fraction of the respective monomeric units; the sum of a+b+c+d=1. The range for a is 0.5 to 1.0; the preferred range for a is 0.8 to 1.0. The range for b is 0.0 to 0.2; the preferred range for b is 0.05 to 0.10. The range for c is 0.0 to 0.1; the preferred range for c is 0.0 to 0.05. The range for d is 0.0 to 0.5; the preferred range for d is 0.0 to 0.10. Examples of monomers (A) include lauryl methacrylate, lauryl acrylate, iso-bornyl methacrylate, iso-octyl acrylate, iso-decyl acrylate, n-decyl acrylate, n-decyl methacrylate, n-octadecyl acrylate, and n-octadecyl methacrylate. Combinations of the above-mentioned monomers can also be used. Monomer (A) serves to render the macromer soluble in the solvent wherein polymerization is conducted. Polymers resulting from the homopolymerization of monomer (A) are substantially soluble in the polymerization solvent. Preferred monomers (A) are lauryl methacrylate, lauryl acrylate, iso-bornyl methacrylate, iso-bornyl acrylate, and isooctyl acrylate.

Examples of monomers (B) include 4-vinyl pyridine, 4-vinyl-4'-methyl bipyridine, acetoacetoxyalkyl acrylates such as acetoacetoxyethyl acrylate, acetoacetoxyalkyl methacrylates such as acetoacetoxyethyl methacrylate, alternatively named 2-(methacryloxy)ethyl acetoacetate, and 5-methacryloxymethyl-8-hydroxyquinoline. Monomer (B) chelates with a metal soap to provide a charge to the toner. Monomer (B) is required to be at least bidentate, i.e., at least two ligating groups must be present in close enough proximity such that they can simultaneously bind to a metal center. Monomer (B) must provide a moiety capable of forming a 5- or 6-membered ring about a coordinated metal center. Useful toners can be prepared without using monomer (B); however, it is preferred that a monomer (B) be used. Monomer (B) can be incorporated either in the MAC segment or the CCS segment.

Preferred monomers (C) contain at least two silicon atoms or at least two fluorine atoms in a monomer. Examples of monomers (C) include trialkyl(aryl)silylmethacrylates such as trimethylsilylmethacrylate or (phenyldimethylsilyl)methyl methacrylate, 3-methacryloxypropylbis(trimethylsiloxy)methylsilane, 3-methacryloxypropylpentamethyldisiloxane, tri(trimethylsiloxy)-3-methacryloxypropylsilane, also, named as 3-methacryloxypropyltris(trimethylsiloxy) silane, (trialkyl(aryl)silylmethyl)methacrylate such as trimethylsilylmethyl methacrylate, methacryloxypropyltris(methoxyethoxy)silane, (phenyldimethylsilyl)methylmethacrylate, 2-(trimethylsiloxy)ethylmethacrylate, trialkyl(aryl)silylacrylates, tris(trimethylsiloxy)-3-acryloxypropylsilane, also, named 3-acryloxypropyltris(trimethylsiloxy)silane, 3-acryloxypropylmethylbis(trimethylsiloxy)silane, 3-acryloxypropyldimethyl(trimethylsiloxy)silane, 3-acryloxypropyldimethylmethoxysilane, 3-acryloxypropylmethyldimethoxysilane, 3-acryloxypropyltrimethoxysilane, vinyl pentamethyl disiloxane, vinyl triacetoxysilane, vinyltris(trimethylsiloxy)silane, tris[tris(trimethylsiloxy)siloxy]vinylsilane, 2-propenyltrimethylsilane, 3-acryloxypropylpentamethyldisiloxane, allyltrimethylsilane, and allyltris(trimethylsiloxy)silane. Especially preferred monomers (C) are 3-methacryloxypropyltris(trimethylsiloxy)silane, 3-acryloxypropyltris(trimethylsiloxy)silane, vinyltris(trimethylsiloxy)silane, and tris[tris(trimethylsiloxy)siloxy]vinylsilane. The purpose of the monomers (C) is to provide surface release properties.

Non-limiting examples of highly fluorinated hydrocarbon monomers for monomer (C) include: fluorinated alkenes such as pentafluorostyrene, octafluorostryene, perfluoro-1,4-pentadiene, perfluoro-1,6-heptadiene, 3,5-bis(trifluoromethyl) styrenes, etc.; fluorinated acrylates and methacrylates such as 2,2,3,3,4,4,5,5,6,6,7,7,8,8,8-pentadecafluorooctyl acrylate, 2,2,3,3,4,4,5,5,6,6,7,7,8,8,8-pentadecafluorooctyl methacrylate, 2,2,3,3,4,4,5,5,6,6,7,7,8,8,9,9,10,10,10-nonadecafluoro decyl methacrylate, 1,2,2,3,3,4,4,5,5,6,6-undecafluorocyclohexylmethyl acrylate, 1,2,2,3,3,4,4,5,5,6,6-undecafluorocyclohexylmethyl methacrylate, 1,2,2,3,3,4,4,5,5,6,6-decafluoro-4-trifluoromethylcyclohexylmethyl acrylate, perfluorohexyl acrylate, perfluorobutyl acrylate, perfluorodecyl acrylate, 2,2,2-trifluoroethyl acrylate, 2,2,2-trifluoroethyl methacrylate, 1,1,1,3,3,3-hexafluoro-2-propyl acrylate, $C_8F_{17}SO_2N(n-C_4H_9)CH_2CH_2CCH=CH_2$, etc; trifluorinated alkyl acrylonitriles, e.g., trifluoromethyl acrylonitrile; perfluoroalkyl vinyl ethers such as perfluorobutyl vinyl ether, pentafluoroethyl vinyl ether, etc.; or any other highly fluorinated monomers. The most preferred monomers include perfluorooctyl ether acrylate, perfluorooctyl acrylate, and perfluorooctyl methacrylate.

Examples of monomers (D) include styrene, p-chlorostyrene, methylstyrenes, vinyl ethers or halogenated vinyl esters and halogenated vinyl esters including vinyl acetate, alkylacrylates and alkylmethacrylates, such as methylmethacrylate, ethyl acrylate, n-butylacrylate, isobutylacrylate, phenylacrylate, methylacrylate, ethylmethacrylate, n-butylmethacrylate, hydoxyethylmethacrylate, hydroxypropylmethacrylate, glycidylmethacrylates, vinyl azlactones, vinyl oxazolines, and the like. The monomers (D) can be incorporated in either the MAC segment(s) or the CCS segment(s).

Examples of suitable chain transfer agents for providing a polymer having a hydroxy group include mercaptoalcohols, such as 3-mercapto-1,2-propanediol, 2-mercaptoethanol, 3-mercapto-2-butanol, 1-mercapto-2-propanol, 2-mercapto-3-pyridonol, mercaptophenol, bromoalcohols such as bromoethanol. Another class of chain transfer agents that are useful for preparing a polymer having a free carboxylic acid group include mercaptocarboxylic acids, such as mercaptoacetic acid, and halogenated aliphatic carboxylic acids.

Examples of coupling agents containing a free radically polymerizable group that are suitable for this invention include acryloyl halides (e.g., acryloyl chloride), methacryloyl halides (e.g., methacryloyl chloride), isocyanatoalkyl methacrylate (e.g., isocyanatoethyl methacrylate), and glycidylmethacrylates. Examples of coupling agents containing a free radically polymerizable group include glycidylmethacrylates.

Free radical initiators suitable for this invention include 2,2'-azobis(2-methylpropionitrile), 4,4'-azobis(4-cyanopentoic acid), 2,2'-azobis{2-methyl-N-1,1-bis(hydroxyethyl)propionamide}, 2,2'-azobis{2-methyl-N-[1,1-bis(hydroxymethylethyl)]propionamide}, and 2,2'-azobis{2-methyl-N-(2-hydroxyethyl)propionamide}. Preferred initiators contain a free hydroxy group.

Charge directors suitable for this invention are polyvalent metal ions. The charge director can be introduced in the form of a metal salt. Preferred metal salts comprise metal ions and organic anions as the counterion. Preferred metal ions are Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), and Ti(IV). A preferred metal ion is zirconium(IV). Preferred organic anions are carboxylates or sulfonates derived from aliphatic or aromatic carboxylic or sulfonic acids, preferably aliphatic fatty acids such as stearic acid, behenic acid, neodecanoic acid, diisopropylsalicylic acid, octanoic acid, abietic acid, naphthenic acid, octanoic acid, lauric acid, tallic acid, and the like. Barium Petronate™ (Witco Chemical Corporation, Sonneborn Division, NY) is a useful source of barium ion for the practice of this invention. The metal salts can be introduced either after the polymeric dye is formed or prior to the graft polymerization process.

The CCS unit comprises moieties derived from the free radical polymerization of a monomer containing a chromophore that is covalently linked to the monomer. Preferred free radically polymerizable monomers contain acrylate, methacrylate or vinyl groups. Preferred chromophores are azo, metal-azo, metal-azomethine, anthraquinone, and hydrazone groups. Monomers (A), (B), (C), (D), as defined above for the macromer, may also be copolymerized with the monomer that contains the chromophore. The monomer that contains the chromophore can be present in a range of from 0.1% to 90% by weight, based on the weight of CCS. A preferred range of monomer that contains the chromophore is from 1% to 50%, based on the weight of CCS, the most preferred range being 1% to 10%. Preferred toners comprise copolymers derived from polymerization of monomer (D), such as methyl methacrylate or ethyl methacrylate, wherein monomeric units of monomer (D) are present in the range of 20% to 99% by weight. In another preferred toner, the monomer (D) is present at a level of 60% by weight, the monomer (B) is present at a level of 0 to 10% by weight, and the monomer (C) is present at a level of 0 to 5% by weight, based on the weight of CCS. The total amount of monomer (B) plus monomer (C) must comprise at least 0.5% by weight of the resulting polymeric dye.

Suitable free radically polymerizable monomers containing a chromophore are known in the art. A preferred class of monomers containing a chromophore can be prepared by the reaction of acryloylchloride or alkylacryloylchloride, as shown in the following equation:

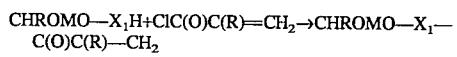

wherein CHROMO represents a chromophore derived from the following dye classes: anthraquinone, azo, metalazo, azomethine, metal-azo-methine, aminostyryl, hydrazone, phthalocyanine, or indoaniline; $X_1$ represents either an oxygen atom or a N-R moiety wherein R represents a hydrogen atom or alkyl group having from 1 to 18 carbon atoms or aryl group having from 6 to 18 carbon atoms in the ring portion thereof. Representative examples of CHROMO—$X_1H$ include 1-aminoanthraquinone, 1-(3hydroxypropylamino)anthraquinone, and Disperse Red 1. Examples of dyes containing acryloyl or methacryloyl groups are described in U.S. Pat. No. 4,614,521 section [D], "sublimable dyes having an acryloyl or a methacryloyl group" and such description is incorporated herein by reference. Another list of dyes containing acryloyl or methacryloyl groups can be found in U.S. Pat. No. 4,795,794, incorporated herein by reference.

Other classes of polymerizable dyes suitable for this invention include metal-azo or metal-azomethine dyes in which a polymerizable heterocycle such as 4-vinyl pyridine, 1-vinylimidazole are ligated to the metal center. Such dyes are described in U.S. Pat. No. 5,166,326, incorporated herein by reference.

Another class of polymerizable dyes suitable for this invention includes those containing a styryl moiety. These materials may be prepared, for example, by the nucleophilic aromatic substitution of a halogen-containing precursor by 4-aminostryene. Particularly useful halogen-containing precursors from the anthraquinone class include, for example, 1-chloroanthraquinone, 1-amino-2-methyl-4-bromoanthraquinone. Other examples of polymerizable anthraquinone dyes are set forth in R. S. Asquith, H. S. Blair, A. A. Crangle, E. Riodan "Self-colored Polymers Based on Anthraquinones", Journal of the Society of Dyers and Colourists, Apr., 1977, pp 114–125, incorporated herein by reference.

Hydrocarbon solvents that are useful in this invention include higher molecular weight hydrocarbons such as mineral spirits, D-Limonene, kerosene, and those having the trademarks "ISOPAR G", "ISOPAR H", "ISOPAR K", "ISOPAR M", "ISOPAR V", "NURPAR", "EXXSOL D3135", "EXXSOL D40", "EXXSOL D60", "EXXSOL D80", "EXXSOL D110", "EXXSOL D130".

The toners of this invention are typically prepared as dispersions that contain from about 15 to about 20% by weight solids. The toners of this invention that are actually used in imaging processes can be prepared by diluting the foregoing dispersions to concentrations of from about 1 to about 2% by weight solids.

Another class of polymeric dyes of this invention can be prepared by the following procedure:

1) combining in a hydrocarbon solvent the following:
   a) at least one monomer capable of undergoing free radical polymerization, said monomer containing a chromophore that is covalently linked to the polymerizable monomer,
   b) at least one monomer capable of undergoing free radical polymerization, said monomer (b) not containing a chromophore, said monomer (b) being soluble in the hydrocarbon solvent,
   c) at least one monomer selected from the group consisting of free radically polymerizable monomers containing two or more fluorine atoms, free radically polymerizable monomers containing one or more silicon atoms, and free radically polymerizable monomers containing a chelating group capable of forming a 5- or 6-membered ring around a coordinated metal center, 2) emulsifying or stirring the mixture formed in step 1, and 3) free radically polymerizing the polymerizable components of the emulsified mixture or stirred mixture in step 2 in the presense of a metal cation.

Monomers that can be used for preparing the mixture in step 1 of the foregoing process can be selected from the monomers (A), (B), (C), and (D) that were used to prepare the macromer previously described. This class of polymeric dyes is less preferred for preparing toners than is the class of polymeric dyes containing macromeric segment(s).

Electrophotographic and electrographic processes involve forming an electrostatic image on the surface of a dielectric medium. The dielectric medium may be an intermediate transfer drum or belt or the substrate for the final toned image itself, as described by Schmidt, S. P. and Larson, J. R. in *Handbook of Imaging Materials Diamond*, A. S., Ed: Marcel Dekker: New York; Chapter 6, pp 227–252, and U.S. Pat. Nos. 4,728,983, 4,321,404, and 4,268,598.

In electrophotography, the electrostatic image is typically formed on a drum coated with a dielectric medium by (1) uniformly charging the dielectric medium with an applied voltage, (2) discharging the electrostatic image in selected areas by exposing those regions to be discharged to light, (3) applying a toner to the electrostatic medium having the charge image, and (4) transferring the toned image through one or more steps to a receptor sheet where the toned image is fixed.

In electrography, a latent image is typically formed by (1) placing a charge image onto the dielectric medium (typically the receiving substrate) a charge in selected areas of the medium with an electrostatic writing stylus or its equivalent to form a charge image, (2) applying toner to the charge image, and (3) fixing the toned image.

While the electrostatic charge of either the toner particles or dielectric medium may be either positive or negative, electrophotography as employed in the present invention normally is carried out by dissipating charge on a positively charged dielectric medium. Toner is then applied to the regions in which positive charge was dissipated.

Because the two processes are similar, toners useful in electrophotography are generally useful in electrography as well. Although both dry and liquid toners may be used to supply the colorant necessary to form the colored image, liquid toners typically provide better resolution in electrophotographic and electrographic imaging applications than do dry toners, but have problems related to difficulties in handling solvents.

Liquid toners are stabilized against flocculation by electrostatic charges that may be either positive or negative (i.e., electrostatic stabilization), and are optionally also stabilized by long chain solvated polymer segments (i.e., steric stabilization). These long chain solvated segments prevent portions of the polymeric resin core of the particles from agglomerating by providing a soluble shell surrounding the insoluble portions of the resin.

Images formed by the present invention may be of a single color or a plurality of colors. Multicolor images can be prepared by repetition of the charging and toner application steps. Full color reproductions may be made according to the present invention by electrophotographic methods as described by U.S. Pat. Nos. 2,297,691, 2,752,833, 4,403, 848, 4,467,334, 2,986,466; 3,690,756; and 4,370,047.

The substrate for receiving the image from the photoconductor preferably should be conformable to the microscopic undulations of the imaging surface. Polymeric materials such as plasticized and compounded polyvinyl chloride (PVC) conform to the imaging surface well, whereas polymeric materials such as polycarbonate do not. Consequently, polycarbonates typically yield poor transfer of the toner image. Other polymeric materials that may be used to form substrates include acrylics, polyurethanes, polyethylene/ acrylic acid copolymer, and polyvinyl butyrals. Commercially available composite materials such as those having the trade designations "SCOTCHCAL" and "PANAFLEX" are also suitable for preparing substrates. However, some materials such as polyesters and polycarbonates, which appear to be too stiff to give microconformability, can be useful for preparing receptors in the present invention by coating them with a sufficiently thick layer of materials having a suitable $T_g$ and a complex dynamic viscosity below about $2.5 \times 10^5$ poise at a temperature in the range of from about 50° C. to about 150° C. On substrates made of materials such as PVC, the coated layer thickness can be as low as 3 micrometers, whereas on substrates made of "SCOTCHLITE" retroreflective material, a coated layer thickness of 30 micrometers may be required.

Other materials suitable for use as substrates may be chosen from a wide variety of materials including papers, siliconized papers, plastics, etc. If a separate electroconductive layer is required, it may be made of thin metal, such as aluminum, tin oxide, or other materials known in the art to be stable at room temperatures and at the elevated temperatures of the transfer process.

The transfer of the formed image from the charged surface to the receiving substrate is enhanced by the incorporation of a release-promoting material within the dispersed particles used to form the image. The incorporation of a silicone-containing material or a fluorine-containing material in the outer (shell) layer of the particle facilitates the efficient transfer of the image.

Toners are usually prepared in a concentrated form to conserve storage space and reduce transportation costs. In order to use the toners in the printer, the concentrate is diluted with additional carrier liquid to give what is termed the working strength liquid toner.

In multicolor imaging, the toners may be applied to the surface of the image sheet in any order, but for colorimetric reasons, bearing in mind the inversion that occurs on transfer, it is preferred to apply the images down in the following order: black, cyan, magenta, and yellow.

In order to function most effectively, liquid toners should have conductance values in the range of 50 to 1200 picomho-cm$^1$. Liquid toners prepared according to the present invention have conductance values of from 100 to 500 picomho-cm$^1$ for a dispersion containing 2% by weight solids.

Overcoating of the transferred image may optionally be carried out to protect the image from physical damage and/or actinic damage. Compositions for overcoatings are well known in the art and typically comprise a clear film-forming polymer dissolved or suspended in a volatile solvent. An ultraviolet light absorbing agent may optionally be added to the coating composition. Lamination of protective layers to the image-bearing surface is also well known in the art and may be used in this invention.

These and other aspects of the present invention are demonstrated in the illustrative examples that follow. The following acronyms are used in the examples.

AAEM: acetoacetoxyethyl methacrylate

TMPS: tris (trimethylsiloxy)-3-methacryloxypropyl silane

IEM: isocyanatoethylmethacrylate

EXAMPLES 8

Materials used in the following examples were available from standard commercial sources such as Aldrich Chemical Co. (Milwaukee, Wis.), unless otherwise specified.

All the liquid toners described in the examples produced films of sufficient integrity to allow image formation and subsequent transfer steps.

Particle sizes were measured by a Coulter Model N4 MD submicron particle size analyzer.

In the examples, all parts and percentages are by weight, unless indicated otherwise.

Preparation of Chromophores

Preparation of 1-methacrylamidoanthraquinone (MAQ)

1-(Methacrylamido)anthraquinone was prepared by a procedure described in British Patent Specification 1,036,700, incorporated herein by reference, with a slight modification. The modification involved heating the 1-aminoanthraquinone o-dichlorobenzene solution to ca. 140°–150° C., prior to addition of the sodium carbonate.

Preparation of 1-[4-[2-hydroxyethyl]phenyl]aminoanthraquinone(HEPAAQ)

HEPAAQ was prepared by a procedure described in Lord, M. W.; Peters, A. T.; J. Chem. Soc., Perkins Trans., 1, (20)2305-8, incorporated herein by reference, with a slight modification. In a 250 mL single-necked round-bottom flask equipped with a reflux condenser was placed 1-chloroanthraquinone (10.5 g), 4-aminophenethyl alcohol (11.2 g), potassium acetate (7.87 g), copper acetate (0.46 g), and nitrobenzene (75 mL). The flask was flushed with nitrogen and then heated to reflux for about 2 hours. The resulting mixture was filtered. The solvent was removed from the filtrate, and the resultant solid was washed with methanol. The product was purified by dissolving the dried filtrate in dichloromethane and chromatographing on a silica column using a 10/90 (v/v) acetone/dichloromethane mixture as the eluent. The solvent was removed from the chromatographed material and dried in vacuo.

Preparation of 1-[4-(2-methacryloxyethyl)phenyl]aminoanthraquinone (REDAQ)

A 500 mL round-bottom flask was charged with HEPAAQ (8.5 g), dimethylaminopyridine (0.89 g), triethylamine (3.44 mL), and anhydrous dichloromethane (200 mL). The resulting mixture was cooled in an ice bath. Methacryloyl chloride (2.36 g) was then added. The reaction was conducted under nitrogen overnight. The resulting solution was run down a silica gel column using dichloromethane as the eluent. The product had the higher "Rf" value. The chromatographed material was recrystallized from a mixture of dichloromethane and methanol.

Preparation of the Methacrylester of Disperse Red 1 (ORANGEAZO)

The methacryl ester of Disperse Red 1 has been previously reported in Matsumoto, S.; Kubodera, K.; Kaino, T. Appl. Phys. Lett. 51,1,(1987), incorporated herein by reference. Into a 250 mL single-necked flask were placed Disperse Red 1 (9.43 g, Aldrich) and dimethylaminopyridine (0.10 g). The flask was sealed with a rubber septum, and the flask was then purged with nitrogen. Anhydrous dichloromethane (approximately 150 mL) was added to the flask via canula tube, and then triethylamine (4.2 mL) was added by syringe. The flask was cooled by placing it in an ice bath. Then methacryloyl chloride (2.8 mL) was added dropwise via a syringe. The reaction was allowed to proceed overnight. The product was isolated by chromatography on silica gel using a 30/70 (v/v) hexane/dichloromethane mixture. The chromatographed product was recrystallized from a mixture of dichloromethane and methanol.

Preparation of 1-(1-ethylpropylamino)anthraquinone (EPAQ).

A Parr stainless steel high pressure reactor was charged with 1-chloroanthraquinone (24.3 g), 1-ethylpropylamine (17.5 g), potassium acetate (14.0 g), activated copper metal (0.7 g), and water (0.05 g). The reaction vessel was sealed and heated to a temperature of 180° C. in an oil bath and maintained at that temperature for 12 hours. The oil bath was removed and the vessel was allowed to return to ambient conditions. The solid was extracted with methylene chloride and the insoluble materials removed by filtration. The solvent was removed and the solid recrystallized from hot methanol. The material was chromatographed on a silica gel column using toluene as the eluent.

Preparation of 1-(1-ethylpropylamino)-4-bromoanthraquinone (BEPAQ)

EPAQ (20.02 g) was dissolved in hot acetic acid. In a separate flask, bromine (12.03 g) was dissolved in acetic acid (ca. 10 mL). The bromine solution was slowly added to the dye solution. The reaction was allowed to proceed for ½ hour, with occasional shaking. The reaction mixture was poured into water (600 mL), and aqueous sodium sulfite was added to discharge the bromine. The aqueous solution was decanted off. The solid was dissolved in methylene chloride, then concentrated, and slowly added to cold methanol, whereupon a solid precipitated.

Preparation of 1-[1-ethylpropylamino]-4-[4-(2-hydroxyethyl)phenyl]amino-anthraquinone (HEPEPAQ)

A 500 mL round-bottom flask equipped with a reflux condenser and a stir bar was charged with BEPAQ (16.0 g), 4-aminophenethylalcohol (11.79 g), potassium acetate (8.0 g), copper acetate (0.57 g), and nitrobenzene (100 mL). The mixture was heated with stirring under a blanket of nitrogen for about 3 hours. At this point, thin layered chromatography showed that a blue material had been formed; however, some starting material was still present. Addition of more copper acetate and potassium acetate, along with continued heating, resulted in little apparent change. The nitrobenzene was removed by vacuum distillation. The desired product was isolated by redissolving the solid in dichloromethane and purifying using a short column of silica gel.

Preparation of 1-[1-ethylpropylamino]-4-[4-(2-methacryloxyethyl)phenyl]amino-anthraquinone (CYANAQ)

A 500 mL single-necked flask was charged with HEPEPAQ (5.2 g) and dimethylaminopyridine (0.04 g). The flask was sealed with a rubber septum and purged with nitrogen. Anhydrous dichloromethane (approximately 75 mL) was added to the mixture via canula tube. The flask was cooled in an ice bath and triethylamine (1.22 g) was added to the mixture. This addition was followed by dropwise addition of methacryloyl chloride (1.26 g). After 2½ hours, some HEPEPAQ was still present. Additional methacryloyl chloride (0.12 mL) was added, and the mixture was stirred overnight. An additional amount of dimethylaminopyridine (0.018 g) and an additional amount of methacryloyl chloride (0.58 g) were added to the mixture. Stirring was continued for approximately 4 hours. The product was purified by chromatography on silica gel using dichloromethane as the eluent and then recrystallized from a mixture of dichloromethane and methanol.

Preparation of aqua[4-[(N,N-dibutylaminosulfonyl-2-hydroxy-1-naphthalenyl)azo]-2,4-dihydro-5-methyl-2-phenyl-3H-pyrazol-3-onato(-2)]2,4-pentanedionato O,O')chromium(CRMAGH$_2$O)

In a 200 mL round-bottom flask were placed N,N-dibutyl-3-hydroxy-4-(5-hydroxy-3-methyl-1-phenyl-1H-pyrazol-4-yl)azo-1-naphthalenesulfonamide (5.36 g), chromium (III) chloride hexahydrate (3.46 g), and dimethyl formamide (50 mL). The mixture was then heated at a temperature of 130° C. for 3 hours. The reaction mixture was cooled to a temperature of 95° C., and 2,4-pentanedione (1.54 mL) and tri-n-butylamine (3.57 mL) were added. After being stirred at this temperature for 1½ hours, the resulting mixture was cooled to a temperature of 25° C. and poured into distilled water (300 mL) that contained several drops of concentrated hydrochloric acid. The product was collected by vacuum filtration, washed with distilled water, and dried under vacuum to afford 7.20 g (100% yield) of CRMAGH$_2$O.

Preparation of chromium(1-phenyl-3-methyl-4[(2-oxy-4-N,N-dibutylsulfonamidonaphthyl)azol-5-pyrazolonate)(acetylacetonate) (4-vinylpyridine) (CRMAG)

In a 100 mL round-bottom flask were placed CRMAGH$_2$O (1.02 g) and dichloromethane (50 mL). As the solution was stirred, 4-vinylpyridine (0.43 ml) was added. After the solution had been stirred for 24 hours, the solvent was removed under vacuum to afford a magenta gum. The gum was triturated by adding several portions of hexane and scraping the sides of the flask. The resulting solid was collected by vacuum filtration and dried under vacuum to afford 1.12 g (100% yield) of CRMAG. The sample was recrystallized from a mixture of toluene, dichloromethane, and heptane to give magenta crystals.

Preparation of Hydrazone Yellow Alcohol (HYYA), Structure I

4-Aminophenethyl alcohol (1.0 g) was dissolved in 2M hydrochloric acid (10 mL) and cooled to ~0° C. In a separate flask, sodium nitrite (0.50 g) was dissolved in 10 mL of deionized water. The sodium nitrite solution was slowly added to the 4-aminophenethyl alcohol solution and the resulting solution stirred for 15 min at ~0° C. to produce the diazonium complex. This diazonium-containing solution was then slowly added to a solution of 1-N-butyl-3-cyano-6-hydroxy-4-methylpyridone (1.50 g) dissolved in 30 mL of methanol. A procedure for preparing the pyridone compound is given U.S. Pat. No. 4,284,782. A yellow precipitate formed immediately, and the resulting suspension was stirred for 45 min. The yellow solid was collected by filtration and dried overnight. The isolated yield was 98%.

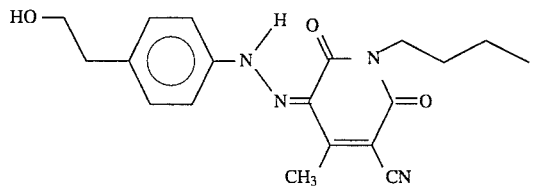

Structure I

Preparation of the methacrylester of HYYA (HYYMA), Structure 2

Into a 100 mL single-necked flask were placed HYYA (1.0 g) and dimethylaminopyridine (0.86 g). The flask was flushed with nitrogen and then 25 mL of anhydrous methylene chloride was added. The solution was cooled to about 0° C. and then triethylamine (0.28 g) was added, followed by the addition of methacryloyl chloride (0.29 g). The ice bath was removed and the reaction mixture allowed to warm to room temperature. Stirring was continued for about 4 hours. The solvent was removed and the product was purified by chromatography on silica gel. The eluent was a mixture comprising 75% by weight methylene chloride and 25% by weight acetone. The yellow fractions were combined and then the solvent was removed. The product was dried in vacuo.

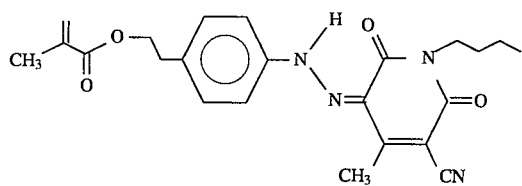

Structure II

A preparation of N-(3'-methacryloylpropyl)-1,4-diaminoanthraquinone-2,3-dicarboximide (Structure III) is given in U.S. Pat. No. 4,795,794 and is incorporated herein by reference.

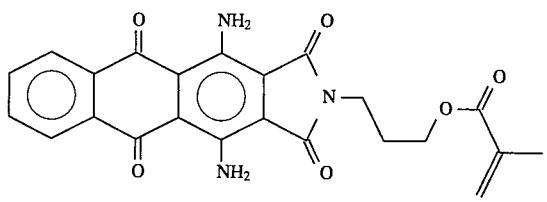

Structure III

Synthesis of Polymeric Dyes a) Synthesis of Macromers

The particles can be stabilized electrostatically or sterically, or both means of stabilization can be used. Electrostatic stabilization involves the incorporation of a charged species such as $Zr^{4+}$, into the particle, which repels like-charged particles, thereby preventing agglomeration. Steric stabilization involves the use of a solvent-swollen polymeric shell insolubilized at the surface but having soluble polymeric chains extending into the solution. These soluble chains provide for a volume exclusion, thereby preventing the approach of another particle and aggregation of particles in dilute toner solutions.

Preparation of Macromer 1

Methacryloxy-terminated poly (lauryl methacrylate-co-acetoacetoxyethyl methacrylate), containing 5.8 mole % of AAEM units, with reactive $-CH_2$ groups of AAEM fully reacted with IEM to form pendant methacryloyl groups [Macromer 1]

A mixture containing lauryl methacrylate (240 g), acetoacetoxyethyl methacrylate (12.5 g), 3-mercapto-1,2-propanediol (0.432 g), 2,2'-azobisisobutyronitrile (0.328 g), and hydrocarbon solvent ("ISOPAR G") (150 g) was heated for 24 hours in a nitrogen atmosphere at a temperature of 70° C. After a viscous liquid had formed, it was diluted to 50% solids by mixing it with the hydrocarbon solvent "ISOPAR G" (102.5 g). The syrup was then divided into two equal parts.

To one part of the syrup, which contained $2.9\times10^{-2}$ moles of AAEM units, a stoichiometric equivalent of isocyanatoethyl methacrylate (4.83 g), followed by dibutyltin dilaurate (0.98 g), were added. The resulting mixture was allowed to react for 48 hours in the dark at ambient temperature.

Preparation of Macromer 2

Poly ( lauryl methacrylate-co-AAEM-co-TMPS) containing 5.8 mole % of AAEM units, 1.94 wt % of TMPS and 2-methacryloxy groups [Macromer 2]

The polymerization procedure was similar to that used to prepared Macromer 1, with the following changes:

(1) The monomer mixture consisted of lauryl methacrylate (240 g), acetoacetoxyethyl methacrylate (12.5 g), tris (trimethylsiloxy)-3-methacryloxy propyl silane (5 g), and 3-mercapto 1,2 propanediol (0.432 g).

(2) To one half of the syrup (257.5 g), isocyanatoethyl methacrylate (0.64 g), followed by dibutyltin dilaurate (0.128 g), were added. The molecular weights of Macromer 2 found by the GPC (polystyrene standard) were as follows: $M_w=1.36\times10^5$; $M_n=6.4\times10^4$.

Preparation of Macromer 3

Poly ( lauryl methacrylate-co-AAEM-TMPS) containing 5.8 mole % of AAEM units and 3.8 wt % of TMPS and 2-methacryloxy groups [Macromer 3]

The same procedure as was used to prepare Macromer 2 was used, with the exception that the weight of TMPS monomer used was 10 g.

Preparation of Macromer 4

Methacryloxy terminated poly (lauryl methacrylate-co-AAEM-co-perfluorooctyl acrylate) [Macromer 4]

A mixture containing lauryl methacrylate (240 g), acetoacetoxyethyl methacrylate (12.5 g), perfluorooctyl acrylate (5 g), and 2,2'-azobisisobutyronitrile (0.328 g) in hydrocarbon solvent "ISOPAR G" (150 g) was polymerized at a temperature 70° C. in the presence of 3-mercapto 1,2 propanediol (0.432 g), which functioned as a chain transfer agent. After 24 hours of polymerization, the syrup was diluted to 50% solids with hydrocarbon solvent "ISOPAR G" (107 g). Isocyanatoethyl methacrylate (1.24 g), followed by dibutyltin dilaurate (0.25 g), were added to the cooled polymer syrup, which was allowed to stand at room temperature for 48 hours.

Preparation of Macromer 5

Methacryloxy pendent poly(lauryl methacrylate-co-hydroxyethyl methacrylate-co-5-methacryloxymethyl-8-hydroxyquinoline) [Macromer 5]

Lauryl methacrylate (150 g), hydroxyethyl methacrylate (4 g), and 5-methacryloxymethyl-8-hydroxyquinoline (8 g) were dissolved in hydrocarbon solvent "ISOPAR G" (150 g). Polymerization was initiated with 2,2'-azobisisobutyronitrile (2 g) at a temperature of 70° C. The resulting product was diluted to 30% solids after the polymerization reaction. Isocyanatoethyl methacrylate (6 g), followed by dibutyltin dilaurate (1 g), were added to the cooled polymer syrup, which was allowed to stand at room temperature for 48 hours.

Preparation of Macromer 6

Methacryloxy pendent poly(lauryl methacrylate-co-methyl methacrylate-co-hydroxyethylmethacrylate-co-5-methacyloxy methyl-8-hydroxyquinoline) [Macromer 6]

Lauryl methacrylate (150 g), methyl methacrylate (34 g), hydroxyethyl methacrylate (6 g), and 5-methacryloxymethyl-8-hydroxyquinoline (10 g) were dissolved in hydrocarbon solvent "ISOPAR L" (232 g). Polymerization was initiated with 2,2'-azobisisobutyronitrile (4 g). After polymerization, the resulting product was diluted to 30% solids. Isocyanatoethyl methacrylate (6 g), followed by dibutyltin dilaurate (1 g), were added to the cooled polymer syrup, which was allowed to stand at room temperature for 48 hours.

In Macromers 5 and 6, units of 8-hydroxyquinoline complexed with the $Zr^{4+}$ charge director.

b) Preparation of Latexes of Polymers having Pendant Dye Moieties

EXAMPLE I

Yellow Polymeric Dye Toner

A mixture comprising ethyl acrylate (90 g), ethyl methacrylate (10 g), and MAQ (2 g) was dissolved in hydrocarbon solvent "ISOPAR G" (700 g). A 50% solution of Macromer 1 (25 g) was added to the solution, and the resulting emulsion was maintained by stirring with a magnetic stirrer bar. A charge control agent ("ZIRCONIUM HEX-CEM", Mooney Chemical, Cleveland, Ohio) (4 g of solution with 12% $Zr^{4+}$ content) was added, and polymerization was initiated by means of 2,2'-azobisisobutyronitrile (0.5 g). After 24 hours of polymerization, about 50 to 100 g of the solvent was pumped out under reduced pressure to remove any residual monomers. A latex containing 4% solids with a mean particle diameter of 124±34 nm was obtained. The conductance was 520 picomho/cm.

EXAMPLE II

Yellow Polymeric Dye Toner

A mixture comprising ethyl acrylate (20 g), ethyl methacrylate (20 g), butyl methacrylate (10 g), and MAQ (3 g) was prepared. A 50% solution of Macromer 2 (20 g) was added to the mixture. A charge control agent ("ZIRCONIUM HEX-CEM", Mooney Chemical, Cleveland, Ohio) (3.5 g of a solution with 12% $Zr^{4+}$ content) was added. The remaining steps of the procedure were identical to those used to prepare the Yellow Polymeric Dye Toner of Example I. The conductance of the 4% latex was 217 picomho/cm.

EXAMPLE III

Cyan Polymeric Dye Toner

A procedure identical to that used to prepare the Yellow Polymeric Dye Toner of Example II was used, with the exception that MAQ was replaced with 2 g of CYANAQ. The conductance was 94 picomho/cm. Particle size was 247±74 nm.

EXAMPLE IV

Orange Polymeric Dye Toner

A procedure identical to that used to prepare the Yellow Polymeric Dye Toner of Example II was used, with the exceptions that MAQ was replaced with 2.68 g of ORANGEAZO, and Macromer 3 was used in place of Macromer 2. The particle diameter was about 230 nm with a conductance of 1180 picomho/cm.

EXAMPLE V

Cyan Polymeric Dye Toner

Polymerizable cyan chromophore (Structure III, 1.25 g) was dissolved in a mixture containing ethyl acrylate (10 g), ethyl methacrylate (10 g), and butyl methacrylate (5 g). The resulting mixture was added dropwise with stirring into a mixture of Macromer 4 (10 g of a 50% solution) and hydrocarbon solvent "ISOPAR G" (350 g). The total reaction mixture was contained in a 3-necked flask fitted with a reflux condenser, thermometer,. and nitrogen vent. A charge control agent ("ZIRCONIUM HEX-CEM", 12% $Zr^{4+}$) was introduced into the reaction mixture (1.75 g). Polymerization was initiated by 2,2'-azobisisobutyronitrile (0.25 g) at a temperature of 70° C. and the reaction was allowed to proceed for 24 hours. The amount of cyan chromophore in the toner particle was 3.9% by weight of the total weight.

EXAMPLE VI

Yellow Polymeric Dye Toner

A procedure identical to that described for preparing the Cyan Polymeric Dye Toner of Example V was used, with the exception that 1.7 g of the yellow chromophore (Structure II) was used in the place of 1.25 g of the cyan chromophore (Structure III).

The amount of perflurooctyl acrylate in the macromer was 1.94% by weight. The amount of perfluorooctyl acrylate units in the toner particle was 0.3% by weight. The amount of yellow chromophore in the toner particle was 5.1% by weight of the total weight.

EXAMPLE VII

Magenta Polymeric Dye Toner

A mixture comprising methyl acrylate (10 g), vinyl toluene (20 g), methyl methacrylate (20 g), butyl acrylate (10 g), and CRMAG (0.25 g) was dissolved in hydrocarbon solvent "ISOPAR G" (375 g). An amount of Macromer 5 equivalent to 30 g of solids was added to the solution to form an emulsion. The resulting emulsion was maintained by stirring with a magnetic stirrer bar. A charge control agent ("ZIRCONIUM TENCEM", 12% of $Zr^{4+}$, 1 ml) was added, and polymerization was initiated by means of 2,2'-azobisvaleronitrile ("VAZO 52", 2 g) Polymerization was conducted at a temperature of 55° C.

EXAMPLE VIII

Magenta Polymeric Dye Toner

A procedure identical to that used to prepare the polymeric dye toner of Example VII was used, with the exceptions that the amount of CRMAG was increased to 1.0 g, and Macromer 6 was used in place of Macromer 5.

EXAMPLE IX

Yellow Polymeric Dye Toner

A procedure identical to that used to prepare the polymeric dye toner of Example VII was used, with the exceptions that CRMAG was replaced with 2 g of MAQ, and Macromer 6 was used in place of Macromer 5.

Typically, the latexes are electroplated at 500 volts onto a photoconductor strip coated with a silicone release layer. The voltage applied to effect the electroplating is generally 500 V. The electroplated film on the photoconductor strip is treated as the image. Transfer of the image can be effected by juxtaposing the image on the photoconductor strip against a plain paper receptor sheet and passing the two juxtaposed sheets through a nip roll laminator set at a temperature of approximately 149° C. (300° F). The actual temperature on the roll is estimated to be 70°–80° C. The pressure of lamination can be set at 64 psi. A "SCOTCHCAL" strip can be used as a backing. The optical density of the image is typically in the range of 0.2 to 1.0, and is a function of the amount of chromophore in the polymeric dye or toner particle.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A process for preparing a composition comprising a hydrocarbon solvent and a polymeric dye comprising a polymeric moiety, a chromophore moiety, and at least one of a charge-directing chelating moiety or a surface release promoting moiety, said polymeric moiety comprising macromeric segment(s) that render said polymeric dye dispersible in a hydrocarbon solvent, said process comprising the steps of:

(1) combining in a hydrocarbon solvent (a) at least one monomer capable of free radical polymerization, which at least one monomer (a) contains a chromophore that is covalently linked to the polymerizable monomer (a), (b) at least one monomer capable of free radical polymerization, which at least one monomer (b) does not contain a chromophore, and (c) at least one macromer that is dispersible in said hydrocarbon solvent, to form a mixture, (2) emulsifying the mixture of step (1) to form an emulsion in said hydrocarbon solvent, and (3) free radically polymerizing the polymerizable components of the emulsion formed in step (2) in the presence of a metal cation.

2. The process of claim 1, wherein said monomer (a) is selected from the group consisting of acrylate monomers, methacrylate monomers, and vinyl monomers.

3. The process of claim 1, wherein said monomer (b) is selected from the group consisting of 4-vinylpyridine, 1-vinyl imidazole, 4-vinyl bipyridine, 4-vinyl-4'-methyl bipyridine, 3-vinylbenzylacetylacetone, 3-allylacetylacetone, acetoacetoxyalkyl acrylates, such as acetoacetoxyethyl acrylate, acetoacetoxyalkyl methacrylates, such as acetoacetoxyethyl methacrylate, alternatively named 2-(methacryloyloxy)ethyl acetoacetate, 5-methacryloxymethyl-8-hydroxyquinoline, N-vinylbenzyliminodiacetic acid, 18-vinyl-5,6-benzo4,7,13,16,21,24-hexaoxo-1,10-diazabicyclo[8.8.8]hexa-cos-2-ene, styrene, p-chlorostyrene, methylstyrenes, vinyl ethers or halogenated vinyl ethers, and halogenated vinyl esters inclusive of vinyl acetates, alkylacrylates and allylmethacrylates, such as methylmethacrylate, ethylethacrylate, ethylacrylate, n-butylacrylate, isobutylacrylate, phenylacrylate, methylacrylate, n-butylmethacrylate, hydroxyethylmethacrylate, hydroxypropylmethacrylate, glycidylmethacrylates, vinyl azlactones, and vinyl oxazolines.

4. The process of claim 1, wherein said monomer (b) is capable of forming a 5- or 6-membered ring when coordinated with a metal cation.

5. The process of claim 1, wherein said monomer (b) is a monomer containing at least two silicon atoms.

6. The process of claim 5, wherein said monomer is selected from the group consisting of 3-methacryloxypropyltris-(trimethylsiloxy)silane, acryloxypropyltris-(trimethylsiloxy)silane, vinyltris(trimethylsiloxy)-silane, and tris[tris(trimethylsiloxy)-siloxylvinylsilane.

7. The process of claim 1, wherein said monomer (b) is a monomer containing at least two fluorine atoms.

8. The process of claim 7, wherein said monomer is selected from the group consisting of perfluorooctyl acrylate, perfluorooctyl methacrylate, and perfluorooctyl ether acrylate.

9. The process of claim 1, wherein said metal cation is $Zr^{4+}$.

* * * * *